United States Patent [19]

Kwong et al.

[11] Patent Number: 5,733,618
[45] Date of Patent: Mar. 31, 1998

[54] CONTAINER COMPRISING BIAXIALLY ORIENTED POLYSTYRENE COMPOSITION AND RUBBER PARTICLES

[75] Inventors: Peter C. Kwong, Wheeling; Arun Menawat, Winfield; Park Ng, Naperville; Kelvin T. Okamoto, Arlington Heights, all of Ill.

[73] Assignee: Packaging Corporation of America, Evanston, Ill.

[21] Appl. No.: 801,347

[22] Filed: Feb. 19, 1997

Related U.S. Application Data

[62] Division of Ser. No. 294,655, Aug. 23, 1994, Pat. No. 5,643,664.

[51] Int. Cl.⁶ .................. B32B 1/08; B32B 5/16
[52] U.S. Cl. .................. 428/36.8; 428/36.92; 428/327; 428/332; 428/523; 428/910
[58] Field of Search ............... 428/327, 332, 428/500, 523, 34.1, 910, 35.5, 35.7, 36.8, 36.92

[56] References Cited

U.S. PATENT DOCUMENTS

| | | | |
|---|---|---|---|
| 3,186,576 | 6/1965 | Whiteford | 220/24 |
| 3,619,344 | 11/1971 | Wolinski et al. | 161/161 |
| 3,684,633 | 8/1972 | Haase | 161/44 |
| 3,826,404 | 7/1974 | Rowe et al. | 220/70 |
| 3,972,961 | 8/1976 | Hammer et al. | 260/857 G |
| 3,995,763 | 12/1976 | Ayres et al. | 220/74 |
| 4,225,476 | 9/1980 | Hammer et al. | 260/27 R |
| 4,309,515 | 1/1982 | Corley | 525/316 |
| 4,500,687 | 2/1985 | Wolfe | 525/412 |
| 5,053,276 | 10/1991 | Siol | 428/394 |
| 5,186,993 | 2/1993 | Hallden-Abberton et al. | 428/36.92 |
| 5,306,778 | 4/1994 | Ishida et al. | 525/310 |
| 5,322,900 | 6/1994 | Siol et al. | 525/216 |
| 5,344,878 | 9/1994 | Colella et al. | 525/84 |

FOREIGN PATENT DOCUMENTS

| | | |
|---|---|---|
| 523599 | 1/1993 | European Pat. Off. |
| 550208 | 7/1993 | European Pat. Off. |
| 04309962 | 11/1992 | Japan |
| 05245928 | 9/1993 | Japan |
| 6-157846 | 6/1994 | Japan |
| 9014390 | 11/1990 | WIPO |

*Primary Examiner*—H. Thi Le
*Attorney, Agent, or Firm*—Arnold White & Durkee

[57] ABSTRACT

The present invention provides biaxially oriented polystyrene composition film and container made of such biaxially oriented film. The films are useful in that they are clear and have improved room and low temperature impact strength. The films include from about 0.1 to about 1.4 weight percent rubber particles, based upon the total weight of the composition. The average diameters of the rubber particles are from about 0.1 micron to about 10 microns.

7 Claims, No Drawings

CONTAINER COMPRISING BIAXIALLY ORIENTED POLYSTYRENE COMPOSITION AND RUBBER PARTICLES

This application is a division of application Ser. No. 08/294,655, filed Aug. 23, 1994, now U.S. Pat. No. 5,643,664.

FIELD OF THE INVENTION

The present invention relates to biaxially oriented polystyrene compositions which are clear and have improved low temperature impact strength. The invention relates as well to a method of using biaxially oriented polystyrene compositions.

BACKGROUND

Polymeric materials are used widely to package and transport a wide variety of consumer goods, including perishable items which must be transported and sold at refrigerator or freezer temperatures. Commercially popular polymeric materials include polyethylene, styrene/butadiene copolymer and polystyrene.

At refrigerator or freezer temperatures, pure polystyrene is unsatisfactory for transporting perishable goods because it is brittle and fails during transportation. A known method of increasing the low temperature impact strength of polystyrene is the addition of rubber to the polystyrene composition. Typically, general purpose polystyrene (GPPS) is blended with high impact polystyrene (HIPS), which usually contains around 7% rubber particles by weight, to form a GPPS/HIPS admixture.

The addition of rubber to a polystyrene composition results in increased impact strength but increases the opacity of the polystyrene. Clear containers for packaging goods are desirable because it allows the customer to see the goods before purchasing. Typically, the percentage of HIPS in polystyrene cannot exceed 1% (0.07% rubber content) because polystyrene compositions with more than 1% HIPS show improved impact resistance but are too hazy for commercial applications. A polystyrene composition comprising 99% GPPS and 1% HIPS is relatively clear but does not have a sufficiently high low temperature impact strength and therefore is not suitable for use at low temperatures. There is a need for a polystyrene composition comprising more than 1% HIPS (0.07% rubber content) which provides higher impact strength at room and low temperatures and is clear. Polystyrene compositions are typical of polymeric materials in that clarity and strength can be improved by orienting the polystyrene molecules. Orientation of polystyrene compositions is accomplished by stretching the GPPS/HIPS admixture. Polymeric compositions can be stretched biaxially. The two axial directions are typically perpendicular to each other. Biaxial stretching improves the clarity of polymeric compositions and increases the impact strength. Biaxial stretching of polystyrene compositions is known (Ayres et al, U.S. Pat. No. 3,995,763). Ayres, however, provides an opaque composition. Furthermore, present commercial biaxially oriented polystyrene compositions are unsatisfactory because of poor impact strength. Thus, there is a need for a clear biaxially stretched polystyrene composition with improved impact strength.

SUMMARY OF THE INVENTION

In one aspect the present invention provides a biaxially stretched polystyrene composition having an haze of less than about 10%. Between −30° F. and ambient temperatures, the polystyrene composition has a falling dart impact strength of between about 10 lbs to about 200 lbs. The polystyrene composition includes rubber particles of about 0.1 to about 1.4 weight percent based on the total weight of the polystyrene composition. The average diameters of the rubber particles included in the polystyrene composition are between 0.1 micron and 10 microns.

In another aspect, a container for transporting and storing perishable items at freezer temperatures is disclosed. The container is made of a biaxially oriented polystyrene composition having a haze of less than about 10%. The container is useful for transporting and storing perishable items because its impact strength at freezer temperatures is between about 10 lbs to about 200 lbs. The containers as taught by the present invention include rubber particles with an average diameter of between 0.1 micron to about 10 microns. The total rubber content of a container by weight is between about 0.1 to about 1.4 percent based on the total weight of the polystyrene composition.

In a third aspect, the present invention provides a polystyrene composition prepared by admixing general purpose polystyrene and high impact polystyrene and biaxially stretching the admixture to biaxially orient the composition. The polystyrene composition prepared by the process as described is clear and has less than about 10% haze. The polystyrene composition further includes about 0.1 to about 1.4 weight percent of rubber particles with average particle diameters of around 0.1 micron to 10 microns.

DETAILED DESCRIPTION OF THE INVENTION

A biaxially oriented polystyrene composition with an haze of less than about 10% and impact strength of about 10 lbs to about 200 lbs at temperatures between −30° F. and ambient temperatures is provided by the present invention.

As used herein, haze is defined as the amount of visible light scattered or absorbed by a biaxially oriented polystyrene composition. Haze increases as more light is scattered or absorbed. Visible light is that radiation visible to the human eye, in particular, wavelengths between 400 nm to 700 nm. As disclosed herein, the haze was measured for polystyrene composition samples with a thickness of around 10 mil or less. As is obvious, there will be more haze with thicker samples and less haze with thinner samples. Sample thickness of between 10 and 20 mil is preferred because typical commercial embodiments of an oriented polystyrene composition of the present invention are between 10 and 20 mil. However, it is understood that if thicker oriented polystyrene compositions are prepared, haze may be greater than 10%.

The impact strength of a biaxially oriented polystyrene composition of the present invention is between about 10 lbs to about 200 lbs at temperatures between −30° F. and ambient temperatures. As used herein, ambient temperatures are typical room temperatures, roughly between 60° F. and 100° F. The impact strength of a biaxially oriented polystyrene composition can be measured with commercially available testing equipment. As disclosed in greater detail in Example 2 below, the impact strength was measured on a DYNATUP Drop Weight System (General Research Corporation, 5383 Hollister Avenue, Santa Barbara, Calif. 93111). The impact strength of a biaxially oriented polystyrene composition increases as the thickness of the composition is increased. The impact strength of polystyrene compositions, with a thickness of around 15 mil, was determined to be between about 10 lbs to about 70 lbs. One of ordinary skill in the art could increase the impact strength of a biaxially oriented polystyrene composition of the present invention by increasing the thickness of the sample. Impact strengths of greater than 200 lbs for biaxially oriented polystyrene compositions that are thicker than 30 mil are thus contemplated by the present invention. In a preferred embodiment, the polystyrene compositions disclosed herein can be prepared by admixing general purpose polystyrene (GPPS) with high impact polystyrene (HIPS) which includes rubber. Alternatively, GPPS can be admixed with neat rubber.

A biaxially oriented polystyrene composition includes from about 0.1 to about 1.4 weight percent rubber based on the total weight of the composition. The rubber increases the impact strength of the composition. In a preferred embodiment, the rubber content is between about 0.15 to about 0.8 weight percent. Rubber particles with average diameters of between 0.1 micron to 10 microns are used in a polystyrene composition of the present invention. Preferred rubber particles have average diameters of between about 0.15 micron to about 8 microns. Most preferably between about a 0.2 microns to about 0.6 microns. Smaller rubber particles are preferred because the use of smaller particles yields compositions with better optical clarity. Smaller rubber particles scatter or absorb less incident light than do larger particles.

The impact strength of a biaxially oriented polystyrene composition of the present invention is between about 10 lbs to about 200 lbs at temperatures between −30° F. and ambient temperatures.

In one embodiment, a biaxially oriented polystyrene composition consists essentially of about 88 to 98 weight percent GPPS and about 2 to about 12 weight percent HIPS. In a preferred embodiment, the biaxially oriented polystyrene composition consists essentially of about 92 to 98 weight percent GPPS and about 2 to about 8 weight percent HIPS. As discussed herein, preferred HIPS typically include rubber particles with average diameters of between about 0.1 micron to about 10 microns.

The present invention discloses a process for preparing a biaxially oriented polystyrene composition. In a preferred embodiment, the biaxially oriented polystyrene composition is prepared by admixing GPPS and HIPS in any extruder equipment. The admixture is then subsequently stretched biaxially to orient the polystyrenes molecules with the appropriate machine direction and transverse direction orientation equipment. (Marshall & Williams, Providence R.I.) As discussed above, biaxially oriented compositions prepared by the disclosed process have a haze of less than about 10% and impact strength of about 10 lbs to about 200 lbs at temperatures between −30° F. and ambient temperatures. Furthermore, the compositions include a rubber content of between 0.1 and 1.4 weight percent based on the total weight of the composition.

Both GPPS and HIPS are available commercially. Preferred GPPS include GPPS available from Novacor, Dow Chemical, Chevron and BASF. Preferred HIPS include but are not limited to DOW Chemical XU-70007.00, AIM 4900; Novacor 4300; BASF 5600; and Chevron Oil HG-200, HG-210, HG-100. Any HIPS with rubber particles with average diameters between 0.1 micron and 10 microns are contemplated by the present invention.

The biaxially oriented polystyrene composition can be prepared by admixing about 88 to about 98 weight percent GPPS with about 2 to about 12 weight percent HIPS. In a preferred embodiment HIPS comprises about 2 to about 8 weight percent of the total weight of the composition.

The biaxially oriented polystyrene composition of the present invention can be formed to provide a container for transporting and storing perishable items at temperatures between −30° F. and ambient temperatures. The composition can be formed and trimmed into containers by well known forming techniques, including the use of thermoforming machines produced by Brown Machine—Models #C-2110R and CS2100—(Division of John Brown Plastics Machinery, 330 North Ross Street, Beaverton, Mich. 48612); Irwin International, Inc.—Models # Magnum, 341 and 342 —(1312 North 16 Avenue, Yakima, Wash. 98902); Lyle Industrial, Inc. (4144 West Lyle Road, Beaverton, Mich. 48612); and Packaging Industrial Group, Inc.,—Sentinel Model #81DF —(Hyannis, Mass. 02601).

EXAMPLE 1

A Biaxially Oriented Composition Prepared with GPPS and DOW XU-70007.00

A biaxially oriented composition comprising Novacor GPPS and DOW XU-70007.00 was prepared by admixing GPPS and XU-70007.00. The admixture was biaxially stretched and further formed into a container about 15 mil thick on thermoforming machines. Haze was measured by using Byk Gardner Haze Meter (HazeGard) (Model #XL-211 Silver Springs, Md.). All of the compositions were clear with the haze of less than about 10 %.

The low temperature drop test was performed by filling a 15 mil thick biaxially oriented polystyrene container with 0.5 pound of water and freezing the water at −9° C. The container containing the ice was dropped from 9 feet to determine the failure of the containers. The following table summarizes the results.

| Percent HIPS | |
| --- | --- |
| 0.5 | cracked at corners |
| 4.5 | no cracking |
| 6.5 | no cracking |

EXAMPLE 2

Biaxally Oriented Compositions Prepared with GPPS and Other Commercially Available HIPS Biaxially oriented compositions comprising GPPS and other commercially available HIPS were prepared using a small laboratory extruder and then were biaxially oriented using laboratory orientation equipment (T. M. Long, Inc. —Model #14 M—(40 South Bridge Street, Somerville, N.J. 08876). The tested material was a 6 to 7 mil thick film. The impact strength was determined on a Dynatup Drop Weight System. (Model #8200 Standard, General Research Corporation, 5383 Hollister Avenue, Santa Barbara, Calif. 93111). Dynatup testing is a falling drop impact test in which the energy required for sample failure is determined by dropping a probe onto and through a sample. During this test, a fiber optic device triggers an oscilloscope just before striking the specimen. A probe with a velocity of 13.9 ft/sec (4.2 m/sec) and total kinetic energy of 90 ft/lb (122 Joules) was dropped on a 4"×4" biaxially oriented polystyrene specimen. When the probe penetrated the specimen, a complete load-time-energy history of the impact was obtained from the trace on the oscilloscope. The total energy absorbed by the specimen was calculated and plotted against time. Dynatup testing provides total energy required for failure as well as the peak energy at failure. The following table lists the impact strengths of these compositions.

| Percent HIPS | Maximum Load (lbs) | | | |
|---|---|---|---|---|
| | 12% | 8% | 6% | 2% |
| Novacor 4300* | 26.5 | 26 | 29 | 28 |
| HG 210* | 23.6 | 20 | 20 | 18.6 |
| HG 200* | 19.7 | 19 | 15.7 | 17.6 |
| HG 100* | 17 | 17 | 18 | 20 |
| AIM 4900* | 17.5 | 16 | 18 | 13.6 |

*Novacor 4300 is available from Novacor; HG 100, HG 200, and HG 210 are available from Chevron Chemical. AIM 4900 is available from Dow Chemical Company.

| COMPARISON AT EQUIVALENT RUBBER LOADINGS | | |
|---|---|---|
| Average Rubber Particle Size, Microns | % Total Rubber in Film Composition | Haze % |
| 0.23 | 0.2 | 1.3 |
| 0.27 | 0.2 | 2.9 |
| 0.37 | 0.2 | 2.1 |
| 3.40 | 0.2 | 2.5 |
| 0.27 | 0.6 | 3.8 |
| 0.37 | 0.6 | 2.1 |
| 3.40 | 0.6 | 7.6 |
| 0.23 | 1.0 | 2.7 |
| 0.27 | 1.2 | 4.8 |
| 0.37 | 1.1 | 3.8 |
| 3.40 | 0.9 | 9.6 |

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the composition, methods and in the steps or in the sequence of steps of the method described herein without departing from the concept, spirit and scope of the invention. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the invention as defined by the appended claims.

What is claimed:

1. A container for storing and transporting food made of a biaxially oriented film having less than about 10% haze when haze is measured with a sample of the film which is less than or equal to 15 mil thick and having an impact strength of about 10 lbs to about 200 lbs between −30° F. and ambient temperature, said biaxially oriented film consisting essentially of about 88 to about 98 weight percent polystyrene and about 2 to about 12 weight percent high impact polystyrene, said high impact polystyrene further comprising rubber particles with an average diameter of about 0.1 micron to about 10 microns, wherein said biaxially oriented film has a rubber content of about 0.1 to about 1.4 weight percent of the total weight of said biaxially oriented film.

2. The container for storing and transporting food of claim 1, wherein the rubber content of said biaxially oriented film is about 0.15 to about 0.8 weight percent of the total weight of said biaxially oriented film.

3. The container for storing and transporting food of claim 1, wherein the rubber content of said biaxially oriented film is about 0.2 to about 0.6 weight percent of the total weight of said biaxially oriented film.

4. The container for storing and transporting food of claim 1, wherein the average diameter of said rubber particles is about 0.15 micron to about 8 microns.

5. The container for storing and transporting food of claim 1, wherein the average diameter of said rubber particles is about 0.2 micron to about 6 microns.

6. The container for storing and transporting food of claim 1, wherein said high impact polystyrene comprises about 2 to about 8 weight percent of the total weight of said biaxially oriented film.

7. The container for storing and transporting food of claim 1, wherein said high impact polystyrene comprises about 2 to about 6 weight percent of the total weight of said biaxially oriented film.

* * * * *